United States Patent [19]
Schibler et al.

[11] Patent Number: 5,453,979
[45] Date of Patent: Sep. 26, 1995

[54] METHOD AND APPARATUS FOR GENERATING ROUTE INFORMATION FOR ASYNCHRONOUS TRANSFER MODE CELL PROCESSING

[75] Inventors: Ross M. Schibler, San Mateo; A. Mitchell Topol, Mountain View; P. Kingston Duffie, Palo Alto, all of Calif.

[73] Assignee: DSC Communications Corporation, Plano, Tex.

[21] Appl. No.: 188,310

[22] Filed: Jan. 27, 1994

[51] Int. Cl.⁶ .................................................. H04L 12/56
[52] U.S. Cl. ...................... 370/60.1; 370/94.2; 370/68.1; 370/110
[58] Field of Search ............................. 370/60, 60.1, 67, 370/94.1, 94.2, 110.1, 68.1, 85.1

[56] References Cited

U.S. PATENT DOCUMENTS

| | | | |
|---|---|---|---|
| 4,484,326 | 11/1984 | Turner | 370/60 |
| 4,488,288 | 12/1984 | Turner | 370/60 |
| 4,488,289 | 12/1984 | Turner | 370/68 |
| 4,550,397 | 10/1985 | Turner et al. | 370/60 |
| 4,829,227 | 5/1989 | Turner | 370/60 |
| 4,849,968 | 7/1989 | Turner | 370/94 |
| 4,862,451 | 8/1989 | Closs et al. | 370/60 |
| 4,922,244 | 5/1990 | Hullett et al. | 340/825.5 |
| 4,947,388 | 8/1990 | Kuwahara et al. | 370/60 |
| 4,955,020 | 9/1990 | Stone et al. | 370/85.9 |
| 4,956,839 | 9/1990 | Torii et al. | 370/60 |
| 5,001,704 | 3/1991 | Narup et al. | 370/85.13 |
| 5,029,124 | 7/1991 | Leahy et al. | 364/900 |
| 5,029,164 | 7/1991 | Goldstein et al. | 370/95.1 |
| 5,050,166 | 9/1991 | Cantoni et al. | 370/94.1 |
| 5,062,106 | 10/1991 | Yamazaki et al. | 370/94.1 |
| 5,130,975 | 7/1992 | Akata | 370/60 |
| 5,130,984 | 7/1992 | Cisneros | 370/94.1 |
| 5,132,966 | 7/1992 | Hayano et al. | 370/79 |
| 5,144,619 | 9/1992 | Munter | 370/60.1 |
| 5,150,358 | 9/1992 | Punj et al. | 370/84 |
| 5,202,883 | 4/1993 | Haterill et al. | 370/67 |
| 5,255,266 | 10/1993 | Watanabe et al. | 370/60.1 |
| 5,287,349 | 2/1994 | Hyodo et al. | 370/60.1 |

OTHER PUBLICATIONS

Steven E. Minzer, "Broadband ISDN and Asynchronous Transfer Mode (ATM)", *IEEE Communications Magazine*, pp. 17–57, Sep. 1989.

A. Lyman Chapin, "Connections and Connectionless Data Transmission", *Proceedings of the IEEE*, pp. 1365–1371, vol. 71, No. 12, Dec. 1983.

Abdi R. Modarressi and Ronald A. Skoog, "Signaling System No. &: A Tutorial", *IEEE Communications Magazine*, pp. 19–35, Jul. 1990.

L. G. Roberts, "Evolution of Packet Switching", *Proceedings of the IEEE*, pp. 1307–1313, vol. 66, No. 11, Nov. 1978.

*Primary Examiner*—Wellington Chin
*Attorney, Agent, or Firm*—Baker & Botts

[57] ABSTRACT

An apparatus for generating route information for asynchronous transfer mode (ATM) cell processing includes a route agent (64) that transmits a route request cell in response to a determination that route information for a particular ATM cell is not found within a route cache (62). A route processor (34) receives the route request cell from the route agent (64) and performs a route lookup operation within a set of routing tables (32). A master processor (30) builds and maintains the routing tables (32) in response to network and switch topologies received from and generated by an administration module (14). The route processor (34) obtains route information, such as destination card and port number, from the routing tables (32) and generates a route response cell containing the appropriate route information. The route agent (64) receives the route response cell from the route process (34) and updates the route cache (62) as determined by a least recently used manager (65). Processing continues on the ATM cell using the newly generated route information and remaining ATM cells within a packet are processed with the newly generated route information in the route cache (62) without any further routing generation.

17 Claims, 3 Drawing Sheets

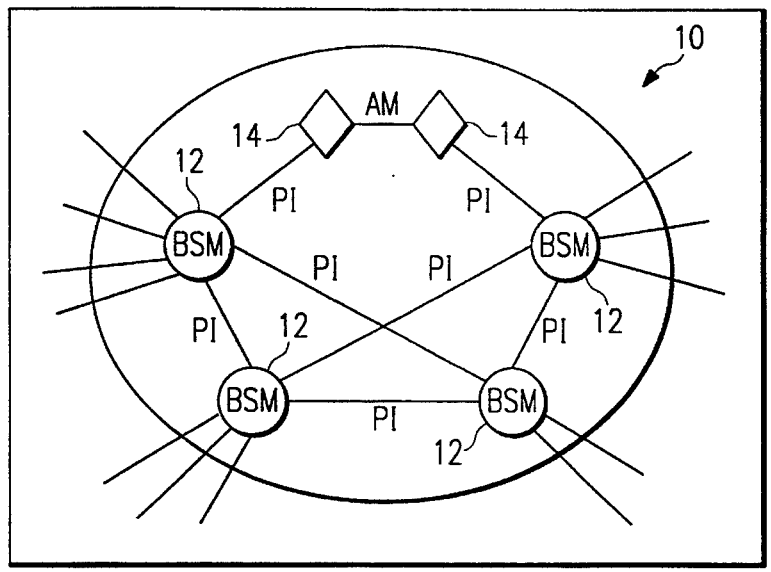
*FIG. 1*
*FIG. 2*
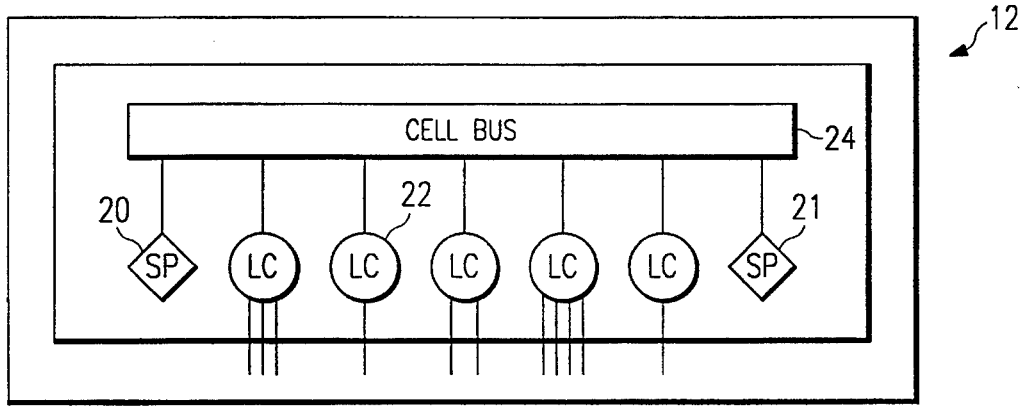
*FIG. 3*
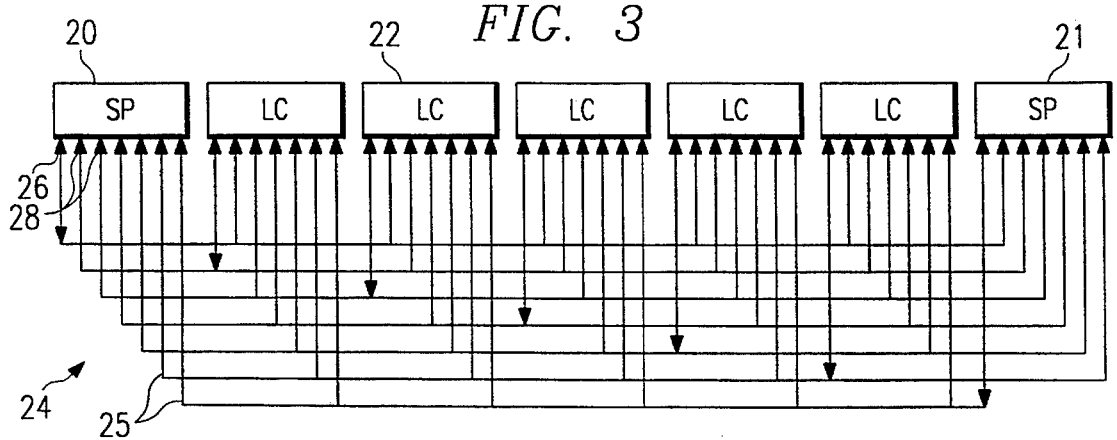

METHOD AND APPARATUS FOR GENERATING ROUTE INFORMATION FOR ASYNCHRONOUS TRANSFER MODE CELL PROCESSING

TECHNICAL FIELD OF THE INVENTION

This invention relates in general to telecommunication switching systems and more particularly to a method and apparatus for generating route information for asynchronous transfer mode cell processing.

BACKGROUND OF THE INVENTION

Conventional telecommunication switching systems, upon deriving a destination address during processing of a telephone call, must send a message to a remote database system in order to request routing information for a particular call. Remote database systems provide a menu of routing information and routing information is selected from the database system according to the request from a telecommunication switching system. Conventional telecommunication switching systems do not have the capability to locally generate routing information in response to a call comprising asynchronous transfer mode cells. It is therefore desirable to have a telecommunication switching system that locally generates routing information for asynchronous transfer mode cell processing.

From the foregoing, it may be appreciated that a need has arisen for a telecommunication switching system that avoids requesting route information from a remote database system. A need has also arisen for a telecommunication switching system that generates routing information for processing asynchronous transfer mode cells.

SUMMARY OF THE INVENTION

In accordance with the present invention, a method and apparatus for generating routing information for asynchronous transfer mode cell processing are provided which substantially eliminate or reduce disadvantages and problems associated with conventional telecommunication switching systems.

According to an embodiment of the present invention, there is provided a method and apparatus of generating routing information during asynchronous transfer mode cell processing that includes a route agent that generates a route request in response to an indication that route information is not available for a particular ATM cell within a cache memory. The route request is processed by a route processor in order to generate routing information for the particular ATM cell. A route processor generates a route response in response to the route request. The route response includes route information for the particular ATM cell to be placed within a cache memory by the route agent. Route information is obtained by the route processor through a plurality of routing tables that are created and maintained by a master processor. The master processor builds the routing tables from topology information received from an administration subsystem that determines network and switch topologies.

The method and apparatus of the present invention provide various technical advantages over conventional telecommunication switching systems. For example, one technical advantage is in generating route information from the routing tables for use by the telecommunication switching system. Another technical advantage is in maintaining recently used route information generated within the telecommunication switching system. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 illustrates an architecture for a broadband services switching system;

FIG. 2 illustrates an architecture of a broadband switching module within the broadband services switching system;

FIG. 3 illustrates a block diagram of a cell bus for the broadband switching module;

DETAILED DESCRIPTION OF THE INVENTION

Figure 4:
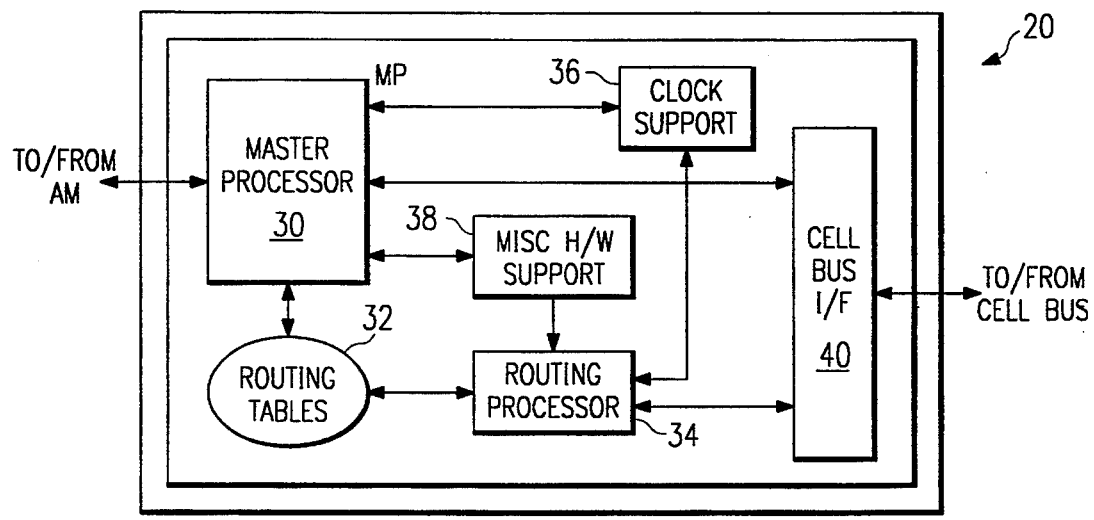
FIG. 4 illustrates a block diagram of a supervisory processor within the broadband switching module.

FIG. 1 is a block diagram of a broadband services switching system 10. Broadband services switching system 10 is based on a network of broadband switching modules 12. Broadband switching modules 12 are interconnected within broadband services switching system 10 by means of proprietary interfaces PI. Each broadband switching module 12 within broadband services switching system 10 need not be connected by proprietary interfaces PI to every other broadband switching module 12 within broadband services switching system 10. Broadband services switching system 10 also includes an administration module 14 that manages the operations, administration, and maintenance for broadband services switching system 10. Broadband services switching system 10 is a large data communication switching product based on broadband integrated services digital network packet switching technology using asynchronous transfer mode (ATM) cells. Broadband services switching system 10 interfaces with a variety of data communication services, including switched multi-megabit data service (SMDS) and frame relay service, for use in central office applications.

FIG. 2 is a block diagram of a broadband switching module 12. Broadband switching module 12 includes supervisor processor cards 20 and 21 and a plurality of line cards 22 interconnected through a cell bus 24. Broadband switching module 12 is made up of a number of switching nodes which are fully interconnected by means of cell bus 24. One node is supervisor processor card 20. A second node is a second supervisor processor card 21 which is a fully redundant mate to supervisor processor card 20 and is used for fault detection and recovery. The remaining nodes are line cards 22 configured according to the type of interface to be provided, such as either a physical link or a logical interface. Each line card 22 is an interface module to an appropriate traffic configuration service, such as SMDS, frame relay, or a proprietary interface PI. Cell bus 24 provides the mechanism for transferring information between nodes on broadband switching module 12.

FIG. 3 is a block diagram of the architecture for cell bus 24. Cell bus 24 is made up of many individual busses 25 according to a number of nodes in broadband switching module 12. Each node is assigned one channel 26 for transmit/receive and the remaining channels 28 to any node are for receive only. Each individual bus of cell bus 24 is controlled by a transmitter channel portion of the transmit/receive channel at the corresponding node. The transmitter portion of the transmit/receive channel determines which receive channel accepts the information over the individual bus. The information signals carried over individual busses include data, parity, clock, and cell pulse. Each transmitter portion supplies parity protected data, a clock, and a cell pulse indicating the start of new cells. The first 56 octets on a bus following the cell pulse define one cell on the bus. Additional cells do not begin until new cell pulses are created. More information concerning cell bus 24 can be found in copending U.S. patent application Ser. No. 08/015,695, entitled "High Speed Packet Bus", which is hereby incorporated by reference herein.

FIG. 4 is a block diagram of supervisor processor card 20. Supervisor processor card 20 includes a master processor 30 that builds and maintains routing tables 32 in response to routing topologies received from administration module 14. A routing processor 34 looks up routing information from routing tables 32 in response to a route request from a line card 22. A clock support block 36 and a hardware support block 38 provide function, support, and interface operations for supervisor processor card 20. Generated and received traffic is placed on cell bus 24 through a cell bus interface 40.

Supervisor processor card 20 carries the intelligence for broadband switching module 12 and performs various operation, administration, and maintenance functions. Supervisor processor card 20 is responsible for all communications between broadband switching module 12 and administration module 14 such as aggregated accounting information and routing topologies. When requested, supervisor processor card 20 determines routes for traffic entering broadband switching module 12 by returning route responses to appropriate line cards 22.

The routing architecture for broadband services switching system 10 is defined as a hierarchy as shown in Table I.

TABLE I

| Processing Entity | Function |
| --- | --- |
| administration module | network and switch topology |
| master processor | trunk and local subscriber lists |
| route processor | table look up |
| line card | route caching, switching |

Each element in the routing hierarchy passes information to the next element below it in the hierarchy. In addition to being a hierarchy, the architecture is also a tree. An administration module 14 services many broadband switching modules 12. Each broadband switching module 12 services one route processor 34. Each route processor 34 services many line cards 22.

The routing concept employed in this hierarchical design is based upon three things. First, routing is determined on a hop by hop basis. Based on the destination and source addresses found within an ATM cell, it is sufficient to determine the next hop that the associated traffic must traverse. If the corresponding destination is a switching node, that switching node will independently determine the next route for the ATM cell. Second, route generation is performed only when a new address pair is encountered. Each line card 22 maintains routes within a cache memory to facilitate hop determination based on source/destination address pairs. This allows routes to be consistent and independent of factors beyond the address pair. Route generation can be avoided if routing information is found within the cache memory. Further information regarding route determination from a cache memory can be found in copending U.S. patent application Ser. No. 08/188,671, entitled "Method and Apparatus for Route Processing Asynchronous Transfer Mode Cells", which is incorporated by reference herein. Third, routes can be calculated in advance for all possible categories of hypothetical route requests. Tables of precalculated routes can be maintained and changes occurring in switch and network topology require only changes to the created tables.

Since line card 22 function is primarily switching, route processor 34 is the lowest link in the routing generation hierarchy. Route processor 34 accepts route request cells from various line cards within broadband switching module 12, extracting service and addressing information therefrom, and building a route response cell to be delivered to the sending line card 22. After receiving a route request cell from a line card 22, route processor 34 performs a table lookup function through routing tables 32. Routing tables 32 are built and maintained by master processor 30 in response to topology information from administration module 14. In response to a route request received from a line card 22, route processor 34 extracts the service type (typically SMDS), whether the destination address is a single or group address, and the destination address from the route request cell sent by a line card 22. If the destination address is a group address, additional steps will be required to split out the corresponding single addresses and to define a spanning tree based on the source address prefix that uniquely defines one broadband switching module 12. The information extracted from the route request cell is used to index a primary routing table. Table II shows the contents of the primary routing table that may appear for an indexed location.

TABLE II

| Type | Description | Supplementary Information |
| --- | --- | --- |
| 0 | Invalid switch prefix | None |
| 1 | next hop uniquely known | Destination card and port |
| 2 | multiple parallel next hops | pointer to table of possible next hop |
| 3 | within switch and defined by suffix | local switch prefix identification |
| 4 | next hop defined by designated carrier | None |

For an invalid prefix, a corresponding route response cell is generated and returned to the appropriate line card in order to discard the asynchronous transfer mode cell and terminate the call.

If the next hop is uniquely known, a destination card and port number are taken from an appropriate route table and a route response cell is built. A virtual circuit identifier (VCI) to be used for routing is taken from a list of available VCIs placed within the route response cell.

If the next hop can be one of many parallel next hops, the source address is used to select an appropriate routing table 32. A destination card and port number are extracted from the appropriate routing table 32 of possible next hops. A VCI is selected as above and a route response cell is built and sent.

If the next hop is within the switch, then the destination address suffix is used to determine the route. The destination address suffix is used to access an appropriate suffix routing table 32 in order to obtain the proper destination card, port number, and VCI routing information.

If the next hop is defined by a designated interexchange carrier (IEC), that information is extracted from the route request cell. If the route request cell does not contain a designated IEC, then a preferred IEC is determined from a routing table 32 according to the source address. Based on the determined IEC, another routing table 32 defines a destination card and port and a route response cell is accordingly generated. Other routing tables used in conjunction with and subordinate to the primary routing table will have the same form as the primary routing table except that types 3 and 4 will not occur.

Master processor 30 has an intermediate role in the routing generation hierarchy. Master processor 30 builds and maintains tables of routing information that are used by route processor 34 in the execution of route lookups. Master processor 30 may maintain two sets of routing tables for redundancy in order to support table updates that do not interfere with active route lookups. Master processor 30 will inform route processor 34 which tables are to be used at the beginning of each route lookup. Master processor 30 maintains routing tables 32 based on information provided by administration module 14.

Administration module 14 is at the top of the routing generation hierarchy. The function of administration module 14 involves building network and switch topologies. Administration module 14 generates and sends information based on network and switch topologies to master processor 30, including a list of switch address prefixes and corresponding switch identifications for each known switch, a list of subscriber addresses attached to the local switch with preferred carrier information, a list of known individual addresses for each group address, topological information about broadband switching module 12 connections within broadband services switching system 10 and other switches in the remainder of the network, and additional route pre-calculation information. Administration module 14 may send updates to any or all master processors 30 within broadband services switching system 10. From this information, master processor 30 generates routing tables 32 for use by route processor 34.

Figure 5:
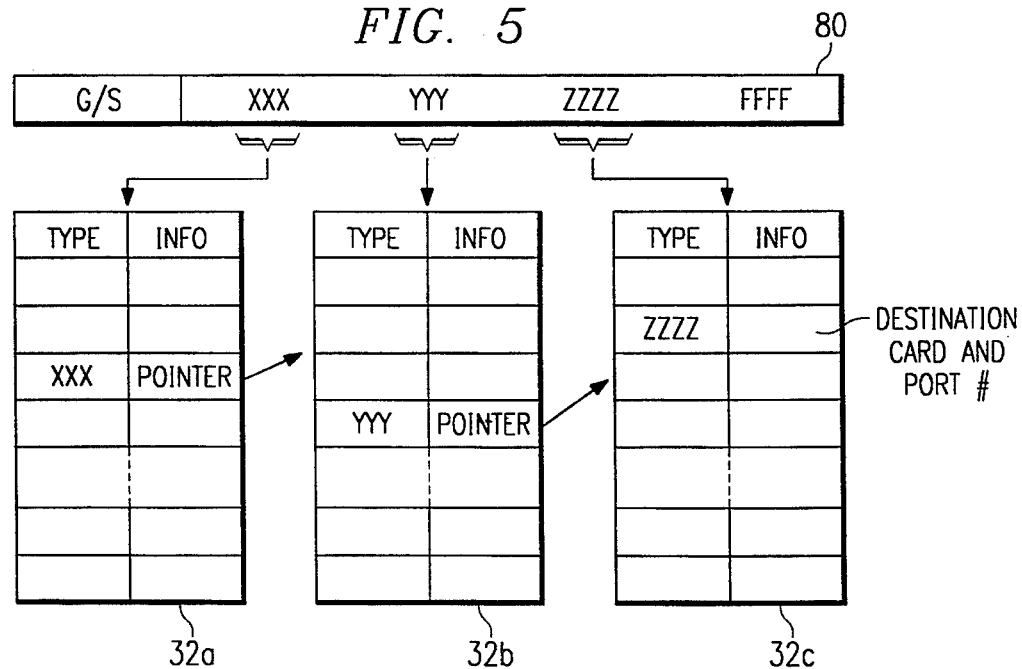
FIG. 5 illustrates a block diagram of route tables within the supervisory processor.

FIG. 5 illustrates the operation of routing tables 32. Routing tables 32 are accessed through various information contained in a destination address 80 found within an ATM cell. Route processor 34 receives the information in a route request cell generated and sent by a line card 22 requiring routing information. Destination address 80 is a 64 bit field including one bit for group or single addressing, eleven four bit binary coded decimal numbers indicating a telephone number of the destination party. Four four bit binary coded decimal numbers indicating the specified carrier identification can be found in the header extension field of the SMDS cell. Each portion of the destination address accesses an appropriate route table 32 in order to determine a destination card and port number required for the ATM cell being processed. Routing tables 32 are accessed based on the area code, exchange, and specific number found in destination address 80.

For destinations within the local access and transport area of a broadband switching module 12, the area code is looked up in a corresponding routing table 32a associated with the area code, resulting in the retrieval of pointer information which points to an appropriate routing table 32b corresponding to exchanges associated with the area code within destination address 80. The exchange of destination address 80 is looked up within the associated routing table 32b, resulting in the retrieval of pointer information to identify an appropriate routing table 32c corresponding to local numbers associated within the exchange. The local number of destination address 80 is looked up in the associated routing table 32c, resulting in the retrieval of the destination card and port number corresponding to destination address 80. Route processor 34 retrieves this destination card and port number and generates a route response cell for transmission back to an appropriate line card 22.

For a group address, associated routing tables 32 are accessed and the info section of the associated routing table 32 includes a list of the single addresses making up the group address. For a group address route generation, each single address lookup is performed separately as described above. If destination address 80 indicates that the destination is outside the local access and transport area, the carrier selection within destination address 80 is used to access appropriate routing tables 32. If no selection is indicated within destination address 80 of the route request, the preselected preferred carrier is used to access the appropriate routing tables 32. The preselected preferred carrier can be found within the source address of the ATM cell being processed.

Figure 6:
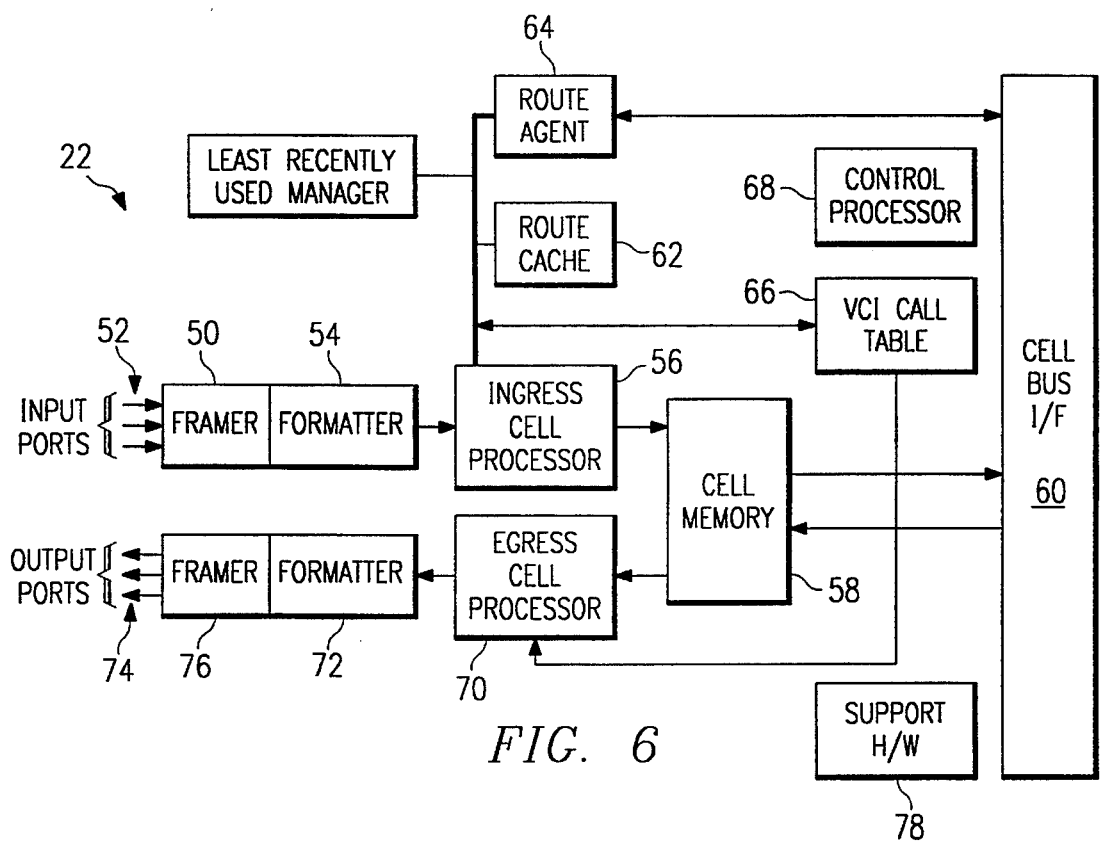
FIG. 6 illustrates a block diagram of a line card within the broadband switching module.

FIG. 6 is a block diagram of a line card 22. Line card 22 includes a framer 50 that receives calls off input ports 52. A formatter 54 converts the data in framer 50 from a traffic specific configuration, such as SMDS or frame relay as determined by input port 52, into ATM cell format. An ingress cell processor 56 receives ATM cells from formatter 54 and appropriately processes ATM cells prior to placement within a cell memory 58. ATM cells within cell memory 58 are transferred to an appropriate line card 22 over cell bus 24 through a cell bus interface 60. Processing performed by ingress cell processor 56 includes retrieving routing information from a route cache 62. If route cache 62 does not contain the appropriate routing information, ingress cell processor 56 must request routing information from supervisor processor card 20 through a route agent 64. A least recently used manager 65 operates in conjunction with route agent 64 to select and update a route cache 62 entry for replacement with routing information returned by supervisor processor card 20. A VCI call table 66 is updated with route information through route agent 64. A control processor 68 supervises and handles all operations within line card 22.

For egressing an ATM cell, line card 22 includes an egress processor 70 that processes each ATM cell according to VCI call table 66. VCI call table 66 is maintained by route agent 64. The ATM cell is then reformatted into the appropriate traffic specific configuration by formatter 72 and transmitted through output ports 74 through framer 76. Line card 22 includes support hardware 78 that includes status, screening, and VCI port tables for use by ingress cell processor 56 and egress cell processor 70. Further information on ingress cell processing can be found in copending U.S. patent application Ser. No. 08/188,671, entitled "Method and Apparatus for Route Processing Asynchronous Transfer Mode Cells", which is incorporated herein by reference. Further information on egress cell processing can be found in copending U.S. patent application Ser. No. 08/339,301, entitled "Apparatus and Method for Processing Asynchronous Transfer Mode Cells", which is incorporated herein by reference.

Figure 7:
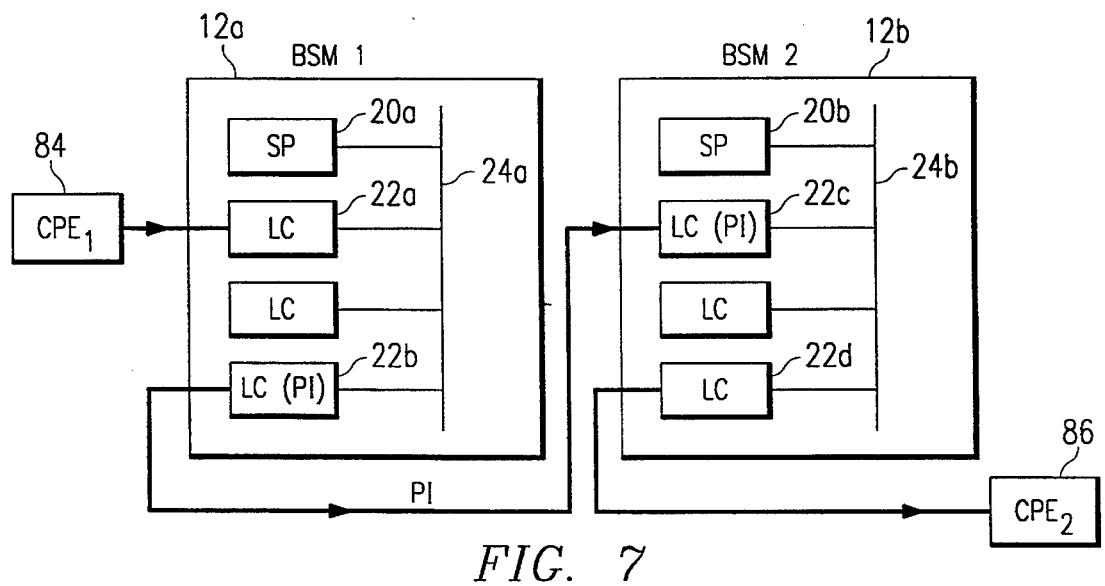
FIG. 7 illustrates a block diagram of a specific example of call processing within a broadband services switching system.

FIG. 7 depicts an example of a single addressed switching and routing scenario. Call information enters broadband services switching system 10 after origination or rerouting in source customer premises equipment 84. Source customer premises equipment 84 may be an individual telephone or a remote switching system. The call information enters a line card 22a at a first broadband switching module 12a in packet form as a series of cells. Line card 22a adapts the incoming call information to the ATM cell format. The cells are routed and switched to a line card 22b that is dedicated to a proprietary interface PI between first broadband switching module 12a and a second broadband switching module 12b. The cells are received at a line card 22c dedicated to proprietary interface PI and switched to line card 22d to complete the delivery of the packet to a destination customer premises equipment 86.

More particularly, ingress line card 22a receives a plurality of cells of a calling information packet. For an SMDS traffic configuration, the first cell of the calling information packet is marked as a beginning of message (BOM) cell and contains a message identification (MID) to distinguish cells belonging to the same packet, a source address, and a destination address. For this example, the destination address corresponds to line card 22d of second broadband switching module 12b. Ingress line card 22a checks the source and destination addresses for a match in route cache 62. If no match is found, route agent 64 allocates an entry in route cache 62, noting a VCI of any displaced entry. A least recently used manager determines the stalest entry in route cache 62 for replacement. Route agent 64 builds a route request cell that includes the displaced VCI information and a copy of the BOM cell.

The route request cell is forwarded to a route processor 34 on supervisor processor card 20a over cell bus 24a. Route processor 34 of supervisor processor card 20a generates routing information for the BOM cell through table lookup in routing tables 32 of supervisor processor card 20a. In this example, route processor 34 of supervisor processor card 20a determines that the destination address is within the same broadband services switching system 10 but on a different broadband switching module 12b. A proprietary interface PI link between broadband switching module 12a and broadband switching module 12b is selected and a unique destination card and port is determined from the routing tables 32 of supervisor processor card 20a. Route processor 34 of supervisor processor card 20a obtains an available VCI for that unique destination card and port and generates a route response cell having call setup routing information that includes the VCI, a usage count for the VCI, a destination card mask, and a port mask.

Route processor 34 of supervisor processor card 20a delivers the route response cell to ingress line card 22a and to an egress line card 22b that will be receiving the traffic for corresponding transmission to the appropriate proprietary interface PI. Ingress line card 22a receives the route response cell and fills the allocated entry of the displaced VCI in route cache 62 with the new call setup routing information included within the route response cell. VCI call table 66 is also updated to reflect the destination information. Egress line card 22b also receives the route response cell and sets up the call according to the generated VCI within the route response cell. Ingress line card 22a builds a route setup cell that includes the call setup routing information and a setup mandatory flag and delivers the route setup cell to cell bus 24. Egress line card 22b detects the matching destination card mask of the route setup cell and delivers the route setup cell over proprietary interface PI. The route setup cell is used to establish connection path for the ATM cells of a calling information packet. Further information regarding the route setup cell can be found in copending U.S. patent application Ser. No. 08/188,559, entitled "Method of Transmitting Call Information Prior to Establishing a Connection Path", which is incorporated by reference.

Ingress line card 22c on second broadband switching module 12b corresponding to proprietary interface PI receives the route setup cell. Since the setup mandatory flag is set, route agent 64 of ingress line card 22c generates a route request cell for delivery to route processor 34 on supervisor processor card 20b. A corresponding entry indexed by the VCI of the route setup cell is made in the VCI call table 66 of ingress line card 22c. Line cards 22a and 22b dedicated to proprietary interfaces PI between broadband switching modules 12 do not require a route cache since any cell received over a proprietary interface within a broadband services must proceed to a line card in the corresponding broadband switching module. Line cards dedicated to a proprietary interface employ a call table to route the ATM cells to the appropriate destination line card within the broadband switching module. Route processor 34 in supervisor processor card 20b of second broadband switching module 12b receives the route request cell and performs a table lookup within routing tables 32 to generate appropriate routing information which, in this example, corresponds to line card 22d in the same broadband switching module.

Routing tables 32 provide a destination card mask and port mask for route processor 34 from which a VCI and usage count is generated for incorporation into a route response cell. The route response cell is returned to ingress line card 22c and egress line card 22d. Ingress line card 22c updates its VCI call table and the route setup cell and delivers the route setup cell to cell bus 24. Egress line card 22d detects a matching destination card mask and captures the route setup cell off of cell bus 24. Egress line card 22d directs the route setup cell to the appropriate port for transmission to destination customer provided equipment 86 according to the port mask. The call is now established and other cells having the same MID corresponding to the packet can be delivered to destination customer provided equipment 86 through route cache 62 and VCI call table 66 access on appropriate line cards without any further route generation.

In summary, unavailable routing information is generated by sending a route request from a route agent to a route processor in response to route information not found within a route cache during processing of an ATM cell. The route processor performs a route lookup within a plurality of routing tables to determine the corresponding routing information for the ATM cell being processed. A master processor builds and maintains the routing tables in response to network and switch topologies received from and generated by an administration module. A least recently used manager in conjunction with the route agent updates the route cache with the generated routing information and the ATM cells are processed according to the new routing information.

Thus, it is apparent that there has been provided, in accordance with the present invention, an apparatus and method for generating route information for asynchronous transfer mode cells that satisfy the advantages set forth above. Although the preferred embodiment has been described in detail, it should be understood that various changes, substitutions, and alterations can be made herein without departing from the spirit and scope of the present invention as defined by the following claims.

What is claimed is:

1. An apparatus for generating route information for asynchronous transfer mode (ATM) cells, comprising:

a supervisory processor for receiving a route request that indicates route information is unavailable for a particular ATM cell, said supervisor processor including a route processor for generating a route response in response to said route request, said route response including route information for said particular ATM cell.

2. The apparatus of claim 1, further comprising:

a plurality of routing tables accessible by said route processor for storing route information associated with said route request.

3. The apparatus of claim 2, wherein said route request includes destination and source addresses extracted from said particular ATM cell, said route processor accessing said routing tables in response to said destination and source addresses.

4. The apparatus of claim 2, wherein said supervisor processor includes a master processor for building and maintaining said routing tables.

5. The apparatus of claim 4, further comprising:

an administration subsystem for building network and switch topologies, said administration subsystem sending topology information to said master processor in order to build and update said routing tables.

6. The apparatus of claim 5, wherein said administration subsystem pre-calculates topologies for probable network and switch topology changes.

7. A method of generating route information for asynchronous transfer mode (ATM) cell processing, comprising the steps of:

determining whether route information is available for a particular ATM cell;

creating a route request in response to an indication that route information is unavailable for a particular ATM cell;

generating route information in response to the route request;

creating a route response that includes the generated route information for use in processing the particular ATM cell.

8. The method of claim 7, wherein said generating step includes performing a table lookup in response to source and destination addresses within the route request.

9. The method of claim 7, further comprising the step of:

replacing an available least recently used route with the generated route information.

10. The method of claim 7, further comprising the step of:

updating lookup tables used in said route information generating step in response to network and switch topology changes.

11. The method of claim 7, further comprising the step of:

processing all ATM cells corresponding to a calling information packet that includes the particular ATM cell according to the generated route information.

12. The method of claim 7, further comprising the step of:

placing the generated route information within said particular ATM cell.

13. The method of claim 7, wherein said determining step includes searching a route cache for available route information.

14. An apparatus for generating route information for asynchronous transfer mode (ATM) cells, comprising:

a route agent for generating a route request cell in response to an indication that route information is unavailable for a particular ATM cell, said route request cell being in ATM cell format and including information contained in said particular ATM cell;

a route processor for generating a route response cell in response to receiving said route request cell, said route response cell having route information that includes a destination card mask, a port mask, and a virtual circuit identifier that indicate route information for said particular ATM cell and corresponding ATM cells within a same calling information packet;

a plurality of route tables accessible by said route processor for storing route information, said route processor generating route information from said routing tables in response to said route request cell for placement in said route response cell, said route agent receiving said route response cell and processing said particular ATM cell according to said route information within said route response cell.

15. The apparatus of claim 14, wherein said routing tables are separated based on area code, exchange, and local number of a destination address within said particular ATM cell.

16. The apparatus of claim 14, further comprising:

a least recently used manager for replacing available route information that has not been recently used with said generated route information.

17. The apparatus of claim 14, further comprising:

a route cache memory for storing available route information and providing said route agent with said indication that route information is unavailable for said particular ATM cell.

* * * * *